United States Patent
Shanbhag et al.

(10) Patent No.: US 8,290,524 B2
(45) Date of Patent: Oct. 16, 2012

(54) SYSTEMS AND METHODS FOR MAINTAINING A TRANSMISSION DURING A CHANNEL FADE

(75) Inventors: Uday Shanbhag, Mumbai (IN); Vivek Vijayan Nair, Andhra Pradesh (IN)

(73) Assignee: QUALCOMM Incorporated, San Diego, CA (US)

( * ) Notice: Subject to any disclaimer, the term of this patent is extended or adjusted under 35 U.S.C. 154(b) by 1021 days.

(21) Appl. No.: 12/015,456

(22) Filed: Jan. 16, 2008

(65) Prior Publication Data

US 2008/0207246 A1 Aug. 28, 2008

Related U.S. Application Data

(60) Provisional application No. 60/885,353, filed on Jan. 17, 2007.

(51) Int. Cl.
*H04B 15/00* (2006.01)
(52) U.S. Cl. ........... 455/504; 455/63.1
(58) Field of Classification Search ........... 455/450, 455/452.1, 452.2, 501, 504, 505, 506, 63.1, 455/67.11, 67.13
See application file for complete search history.

(56) References Cited

U.S. PATENT DOCUMENTS

| | | | |
|---|---|---|---|
| 5,905,945 A * | 5/1999 | Hill et al. | 340/7.44 |
| 7,010,319 B2 | 3/2006 | Hunzinger | |
| 2002/0137535 A1 * | 9/2002 | Hunzinger | 455/522 |
| 2003/0203735 A1 * | 10/2003 | Andrus et al. | 455/450 |
| 2006/0133409 A1 | 6/2006 | Prakash et al. | |

FOREIGN PATENT DOCUMENTS

| | | |
|---|---|---|
| GB | 2318256 | 4/1998 |
| JP | 2004524720 A | 8/2004 |
| KR | 19970009676 | 6/1997 |
| WO | 2004054305 | 6/2004 |

OTHER PUBLICATIONS

Upper Layer (Layer 3) Signaling Standard for cdma2000 Spread Spectrum Systems; 3GPP2 C S0005-D; Version 2.0; Sep. 6, 2005; (3rd Generation Partnership Project 2 "3GPP2".) Relevant sections: 2.6.4.1.8.1 (pp. 2-388 to 2-391); 2.6.6.2.13 (pp. 2-654 to 2-656); 3.6.6.2.4 (pp. 3-96 and 3-97); and Table D-2 (p. D-8).
International Search Report—PCT/US08/051370—International Search Authority—European Patent Office—Sep. 19, 2008.
Written Opinion—PCT/US08/051370—International Search Authority—European Patent Office, Munich—Sep. 19, 2008.
Taiwan Search Report—TW097101882—TIPO—Jun. 14, 2011.

* cited by examiner

*Primary Examiner* — Blane J Jackson
(74) *Attorney, Agent, or Firm* — Francois A. Pelaez; Howard H. Seo

(57) ABSTRACT

A method for maintaining a transmission during a channel fade is described. Data is transmitted on a first traffic channel associated with a first signal. A second signal with a signal strength that is greater than the signal strength of the first signal is detected. A transmitter is disabled if N2m is triggered. The triggering of N2m indicates the presence of a channel fade for a predetermined first time period. The second signal is monitored for a predetermined second time period. Data is transmitted on a second traffic channel associated with the second signal at the expiration of the second time period.

25 Claims, 8 Drawing Sheets

SYSTEMS AND METHODS FOR MAINTAINING A TRANSMISSION DURING A CHANNEL FADE

RELATED APPLICATIONS

This application is related to and claims priority from U.S. Provisional Patent Application Ser. No. 60/885,353 filed Jan. 17, 2007, for METHOD AND APPARATUS FOR WIRELESS TELEPHONE CALL RESCUE, with inventors Uday Shanbhag and Nair Vivek Vijayan, which is incorporated herein by reference.

TECHNICAL FIELD

The present disclosure relates generally to communications and wireless communications-related technologies. More specifically, the present disclosure relates to systems and methods for maintaining a transmission between a mobile station and a base station during a channel fade.

BACKGROUND

Wireless communication networks are widely deployed to provide various types of services such as voice, packet data, broadcast, and so on. For example, these wireless networks include Code Division Multiple Access 2000 (CDMA2000) networks, Global System for Mobile Communications (GSM) networks, Wideband Code Division Multiple Access (W-CDMA) networks and Worldwide Interoperability for Microwave Access (WiMAX) networks.

Each wireless network utilizes a particular air interface to support over-the-air communication and typically further implements a particular mobile networking protocol that supports roaming and advanced services. For example, a W-CDMA network utilizes a code division multiple access (CDMA) air interface and GSM EDGE Radio Access Network (GERAN) networking protocol.

The telecommunication standards cited above are examples of some of the various communications systems that may be implemented to transmit voice and/or data. Within these systems, multiple channels may be available to be utilized by multiple types of transmissions. If a channel experiences a fade (decrease in quality), transmissions may be lost or disrupted. As such, benefits may be realized by improved systems and methods for maintaining transmissions during a channel fade.

DETAILED DESCRIPTION

Figure 1:
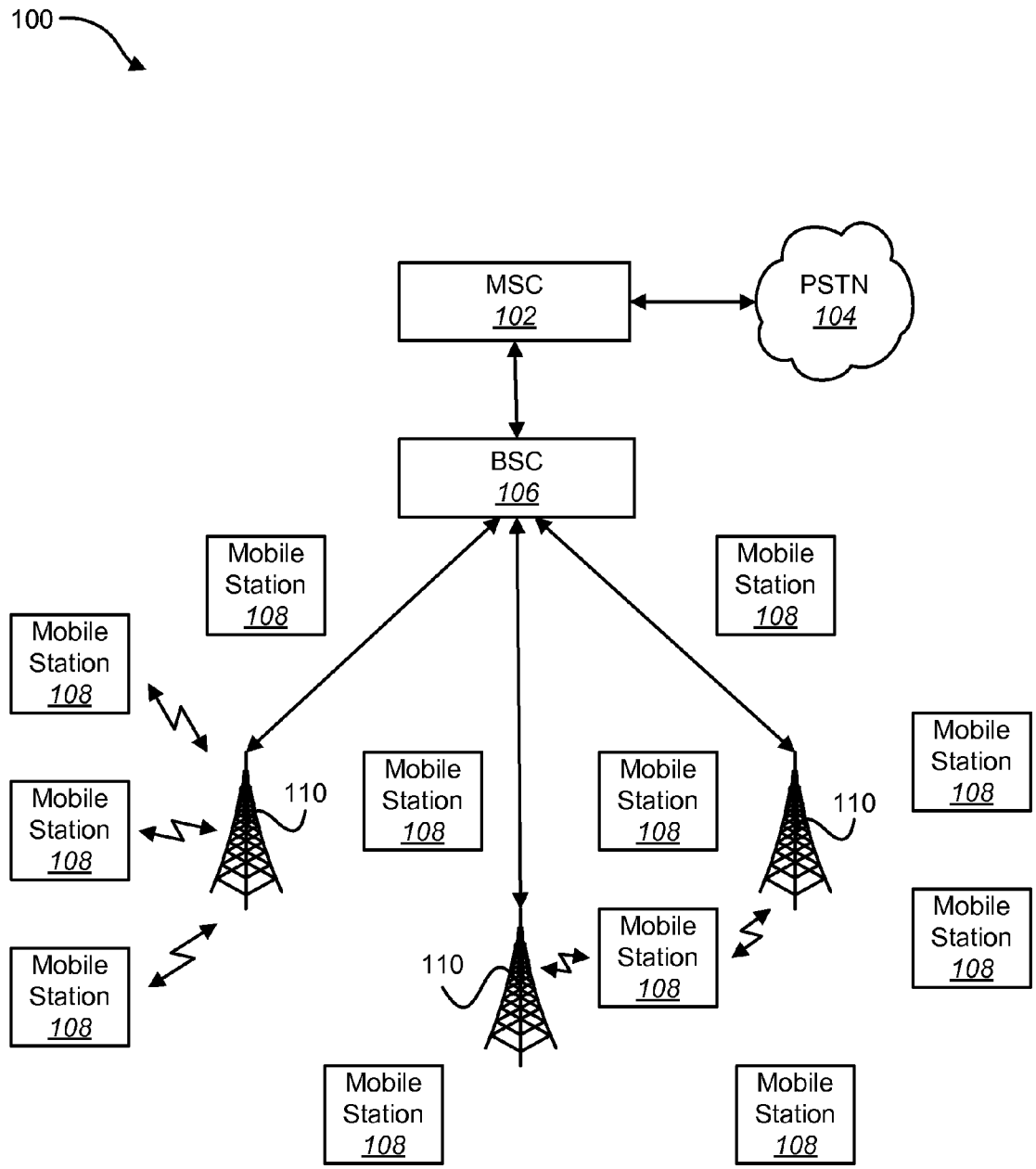
FIG. 1 illustrates an example of a code division multiple access (CDMA) wireless telephone system.

A method for maintaining a transmission during a channel fade is described. Data is transmitted on a first traffic channel associated with a first signal. A second signal with a signal strength that is greater than the signal strength of the first signal is detected. A transmitter is disabled if a channel fade is detected for a predetermined first time period. The second signal is monitored for a predetermined second time period. Data is transmitted on a second traffic channel associated with the second signal at the expiration of the second time period.

A mobile device for maintaining a transmission during a channel fade is also described. The mobile device includes a processor and memory in electronic communication with the processor. Instructions are stored in the memory. The instructions are executable to transmit data on a first traffic channel associated with a first signal and detect a second signal with a signal strength that is greater than the signal strength of the first signal. The instructions are also executable to disable a transmitter if a channel fade is detected for a predetermined first time period. The instructions are executable to monitor the second signal for a predetermined second time period and transmit data on a second traffic channel associated with the second signal at the expiration of the second time period.

An apparatus for maintaining a transmission during a channel fade is also described. The apparatus includes means for transmitting data on a first traffic channel associated with a first signal and means for detecting a second signal with a signal strength that is greater than the signal strength of the first signal. The apparatus also includes means for disabling a transmitter if a channel fade is detected for a predetermined first time period. The apparatus further includes means for monitoring the second signal for a predetermined second time period and means for transmitting data on a second traffic channel associated with the second signal at the expiration of the second time period.

A computer-program product for maintaining a transmission during a channel fade is also described. The computer-program product includes a computer readable medium having instructions thereon. The instructions include code for transmitting data on a first traffic channel associated with a first signal and code for detecting a second signal with a signal strength that is greater than the signal strength of the first signal. The instructions also include code for disabling a transmitter if a channel fade is detected for a predetermined first time period. The instructions also include code for monitoring the second signal for a predetermined second time period and code for transmitting data on a second traffic channel associated with the second signal at the expiration of the second time period.

A base station for re-routing data on a forward channel is also described. The base station includes a processor and memory in electronic communication with the processor. Instructions are stored in the memory. The instructions are executable to transmit data on a first forward channel using a first pilot signal and receive a registration message. The instructions are also executable to receive a high priority access attempt for a second forward channel. Signaling messages associated with the high priority access attempt are processed with a higher priority than signaling messages not associated with the high priority access attempt. The instructions are also executable to allocate resources associated with the high priority access attempt when the resources are available and transmit data on the second forward channel using a second pilot signal. The instructions are further executable to remove resources associated with the first forward channel.

Communications service may be performed between a base station and a mobile station. The base station may transmit data packets and control messages to the mobile station over a forward link. The base station may also receive data packets and control messages from the mobile station over a reverse link. The transmission of data to/from a base station/mobile station may be done according to a protocol, such as code division multiple access (CDMA).

The mobile station may monitor the performance of a forward traffic channel during a call. When the mobile station receives twelve consecutive bad frames (N2m) of data, the mobile station may disable its transmitter so that it will not disrupt other communications on the reverse link. Thereafter, if the mobile station receives two consecutive good frames (N3m), it may re-enable its transmitter. As used herein, "N2m" may refer to the duration of insufficient signal quality (e.g. bad data frames), in units of 20 ms, received on the forward traffic channel before the mobile station disables its transmitter. In one configuration, N2m is twelve. In addition, "N3m" may refer to the duration of sufficient signal quality (e.g. good data frames), in units of 20 ms, received on the forward traffic channel before a mobile station re-enables its transmitter. In one configuration, N3m is two.

In one configuration, the mobile station maintains a counter (N2m) for twelve consecutive bad frames received. The timer may be reset when a certain number of consecutive good frames of data are received on the forward traffic channel. In one configuration, the timer is reset when two (N3m) consecutive good frames of data are received. If a fade timer (T5m) expires, the mobile station may drop the call. As used herein, "T5m" may refer to the limit of the forward traffic channel fade timer. In one configuration, T5m is five seconds.

A CDMA communication device (e.g., a mobile station) may receive a pilot signal on the forward link. The pilot signal may be used on the forward link for synchronization, coherent detection, soft handoff, maintaining orthogonality between base stations, etc. The mobile station may continuously monitor signals received from the base station in order to determine if a new pilot signal with improved signal strength is available.

In some configurations, the mobile station transmits data on the reverse channel using a radio frequency (RF). In one example, the fade of the RF channel may trigger the fade timer. As a result, the mobile station may disable its transmitter so as to not jam the reverse link. Occasionally, the mobile station detects a new pilot signal with improved signal strength and the same (or similar) configuration as the original pilot signal. However, the mobile station may not report the status of the new pilot signal to the base station transmitting the new pilot signal because the transmitter of the mobile station is disabled. In one configuration, a pilot strength measurement message is not reported to the base station because the transmitter is disabled due to N2m and the call may not continue using the new pilot signal.

Current systems and methods to re-establish a call assume that the mobile station will come out of the RF channel fade within the fade interval timer. In addition, in current CDMA standards, a mobile station disables its transmitter in the case of a channel fade (i.e., the mobile station has received consecutive N2m (12) bad frames). With a disabled transmitter, the mobile station may not be in a position to negotiate with a network to use a new pilot signal that is detected after the mobile station has received N2m bad frames or within the fade interval timer (T5m). As such, under current CDMA standards, the call may be revived if the channel fade condition improves within the fade interval timer (e.g., five seconds).

The present systems and methods described herein provide the mobile station with a new chance to maintain a call under RF channel fade conditions and a disabled transmitter. Maintaining a call may be referred to as a call rescue. Once the mobile station establishes a traffic channel state on a new pilot signal, the network may remove the existing traffic channel resources allocated to the mobile station on the old pilot signal. The forward link capacity may be improved because these previously allocated resources are not utilized by the mobile station because the mobile station is in RF channel fade with the old pilot signal.

FIG. 1 illustrates a CDMA wireless telephone system 100 that may include a plurality of mobile stations 108, a plurality of base stations 110, a base station controller (BSC) 106 and a mobile switching center (MSC) 102. The MSC 102 may be configured to interface with a public switch telephone network (PSTN) 104. The MSC 102 may also be configured to interface with the BSC 106. There may be more than one BSC 106 in the system 100. Each base station 110 may include at least one sector (not shown), where each sector may have an omnidirectional antenna or an antenna pointed in a particular direction radially away from the base stations 110. Alternatively, each sector may include two antennas for diversity reception. Each base station 110 may be designed to support a plurality of frequency assignments. The intersection of a sector and a frequency assignment may be referred to as a CDMA channel. The mobile stations 108 may include cellular or portable communication system (PCS) telephones.

During operation of the cellular telephone system 100, the base stations 110 may receive sets of reverse link signals from sets of mobile stations 108. The mobile stations 108 may be conducting telephone calls or other communications. Each reverse link signal received by a given base station 110 may be processed within that base station 110. The resulting data may be forwarded to the BSC 106. The BSC 106 may provide call resource allocation and mobility management functionality including the orchestration of soft handoffs between base stations 110. The BSC 106 may also route the received data to the MSC 102, which provides additional routing services for interface with the PSTN 104. Similarly, the PSTN 104 may interface with the MSC 102, and the MSC 102 may interface with the BSC 106, which in turn may control the base stations 110 to transmit sets of forward link signals to sets of mobile stations 108.

Figure 2:
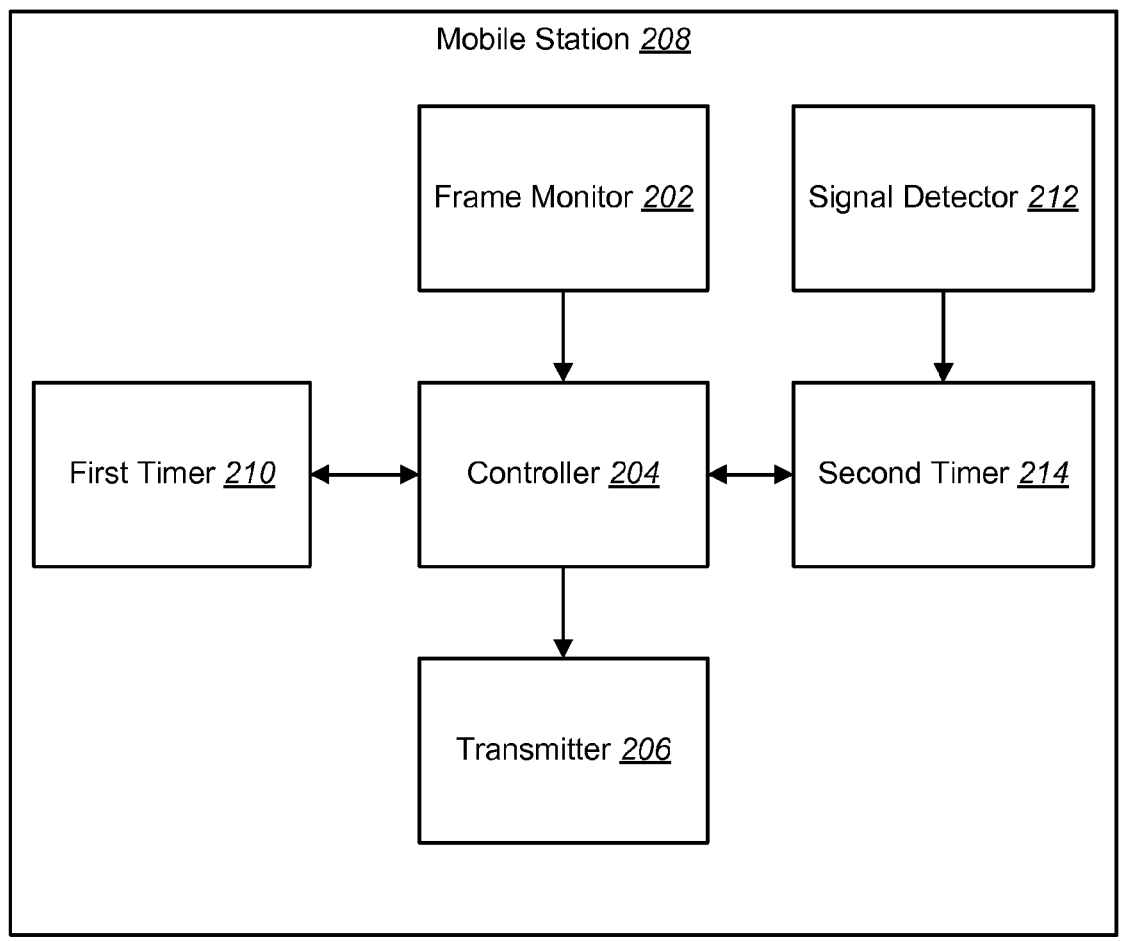
FIG. 2 is a block diagram illustrating a further configuration of a mobile station.

FIG. 2 is a block diagram illustrating a further configuration of a mobile station 208. The mobile station 208 includes a frame monitor 202. The frame monitor 202 may determine the number of consecutive data frames that have been received from a base station. The monitor 202 may communicate with a controller 204. The controller 204 may be in communication with a first timer 210, a transmitter 206 and a second timer 214. If the frame monitor 202 receives a predetermined number of good data frames consecutively, the controller 204 may reset the first timer 210. For example, if the frame monitor 202 receives two good data frames consecutively, the controller 204 may reset the first timer 210. The first timer may be a fade interval timer as previously explained.

In another configuration, the controller 204 may enable or disable the transmitter 206. For example, if the frame monitor 202 receives a predetermined number of bad data frames consecutively, the controller 204 may disable the transmitter 206 in order to prevent the reverse link from being jammed and/or overloaded. In addition, if the frame monitor 202 receives a predetermined number of good data frames consecutively, the controller 204 may re-enable the transmitter 206 if the transmitter 206 had been disabled previously.

The mobile station 208 may also include a signal detector 212. The detector 212 may detect signals being transmitted from one or more base stations 110. In one configuration, the signal detector 212 detects a new pilot signal. The new pilot signal may have improved signal strength than a current pilot signal being used by the mobile station 208. The new pilot signal may be monitored by the mobile station 208 for a predetermined amount of time in order to determine if the new pilot signal is reliable. If the second timer 214 expires, the controller 204 may re-enable the transmitter 206 if it had been disabled previously.

Figure 3:
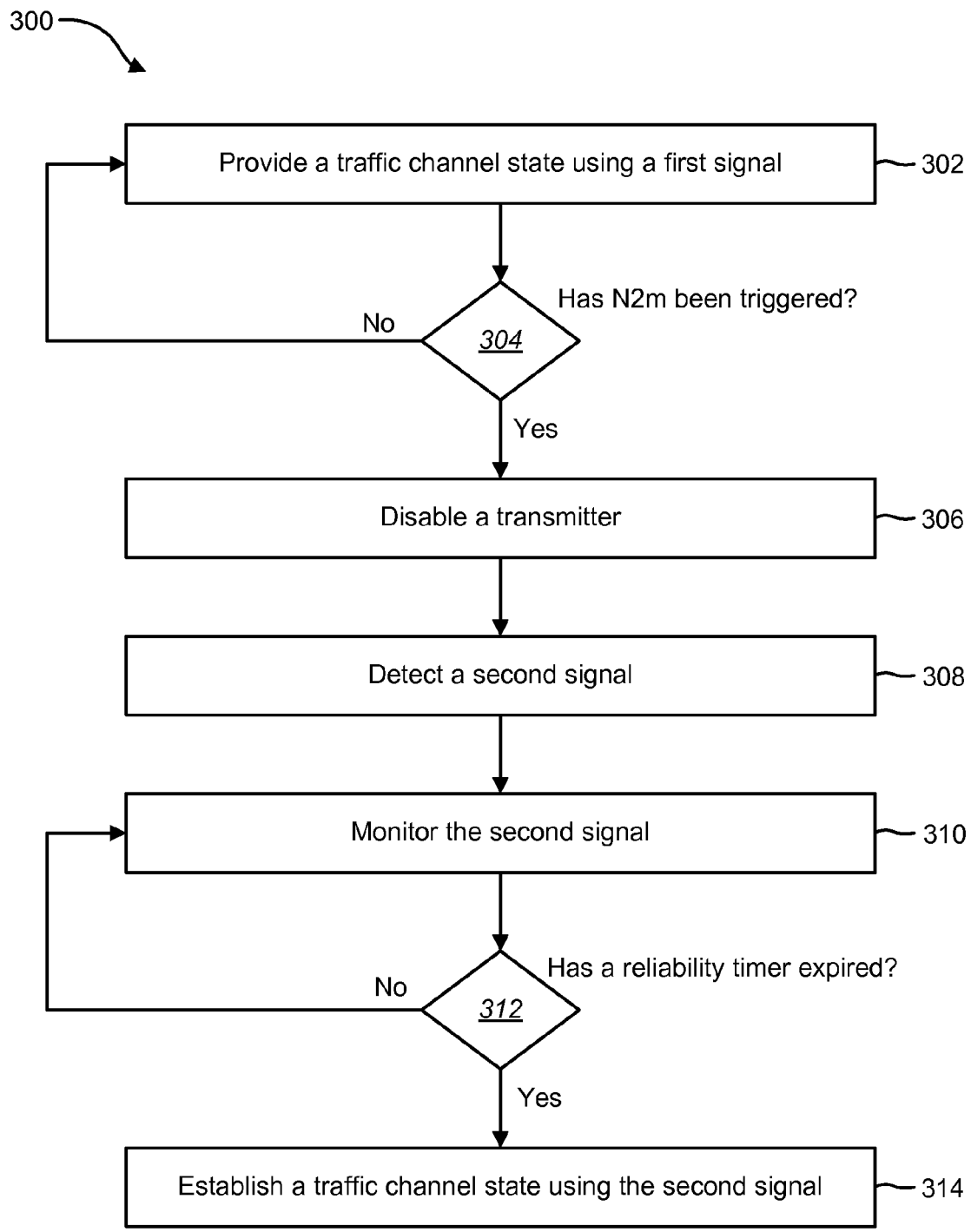
FIG. 3 is a flow diagram illustrating one example of a method for maintaining a transmission during a channel fade.

FIG. 3 is a flow diagram illustrating one example of a method 300 for maintaining a transmission during a channel fade. The method 300 may be implemented by a mobile station 108. In one configuration, a traffic channel state is provided 302 using a first signal. The first signal may be a first pilot signal. In the traffic channel state, a mobile station 108 exchanges user information with a base station 110 using forward traffic channels and reverse traffic channels. To establish the traffic channel state, the mobile 108 checks that it can correctly receive the forward traffic channel and starts to transmit on the reverse traffic channel.

A determination 304 may be made based on N2m which refers to the duration of insufficient signal quality (e.g., bad data frames), in units of 20 ms, received on the forward traffic channel. If it is determined that 304 is true it may indicate that there is a fade in the first signal and the forward traffic channel may be unavailable for receptions. In one example, the fade timer is set for five seconds (T5m). If it is determined that 304 is false, the traffic channel state continues to be provided 302. However, if 304 is true, a second signal may be detected 308. In some configurations, the second signal is detected 308 before a fade interval timer (T5m) expires. The second signal may have improved signal strength over the first signal.

A transmitter may be disabled 306. The transmitter may be disabled 306 because N2m is triggered. As previously explained, N2m refers to the duration of insufficient signal quality (e.g. bad data frames), in units of 20 ms, received on the forward traffic channel. In one example, the second signal is detected 308 after the transmitter is disabled 306. The second signal may be monitored 310. A determination 312 may be made as to whether or not a reliability timer has expired. The reliability timer may be a predetermined amount of time for the mobile station 108 to monitor the second signal to determine if the detected second signal maintains the improved signal strength. If the reliability timer has not expired, the second signal continues to be monitored 310. If the reliability timer has expired, a traffic channel state may be established 314 using the second signal.

Figure 4:
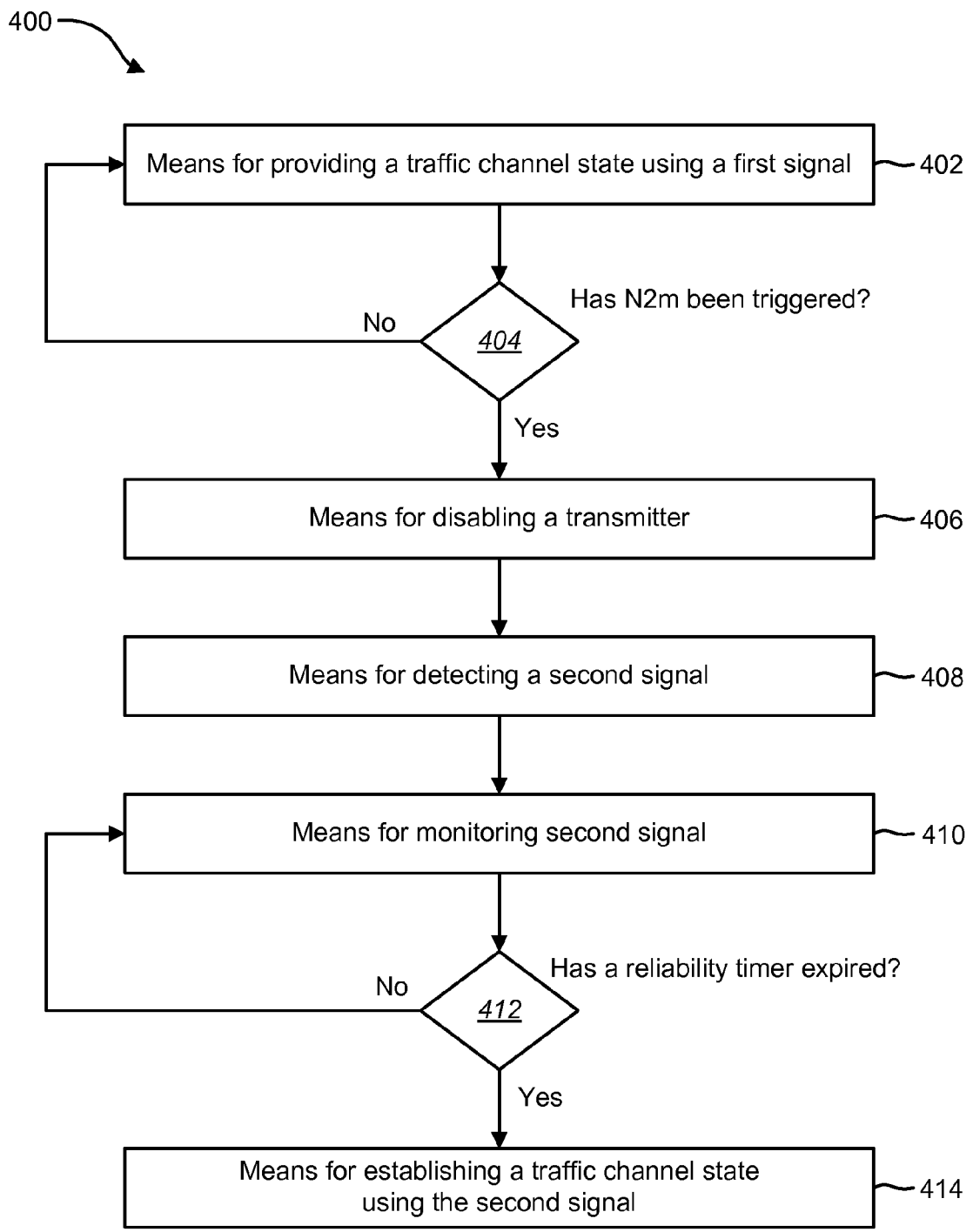
FIG. 4 illustrates means plus function blocks corresponding to the method shown in FIG. 3.

The method 300 of FIG. 3 described above may be performed by various hardware and/or software component(s) and/or module(s) corresponding to the means-plus-function blocks illustrated in FIG. 4. In other words, blocks 302 through 312 illustrated in FIG. 3 correspond to means-plus-function blocks 402 through 412 illustrated in FIG. 4.

Figure 5:
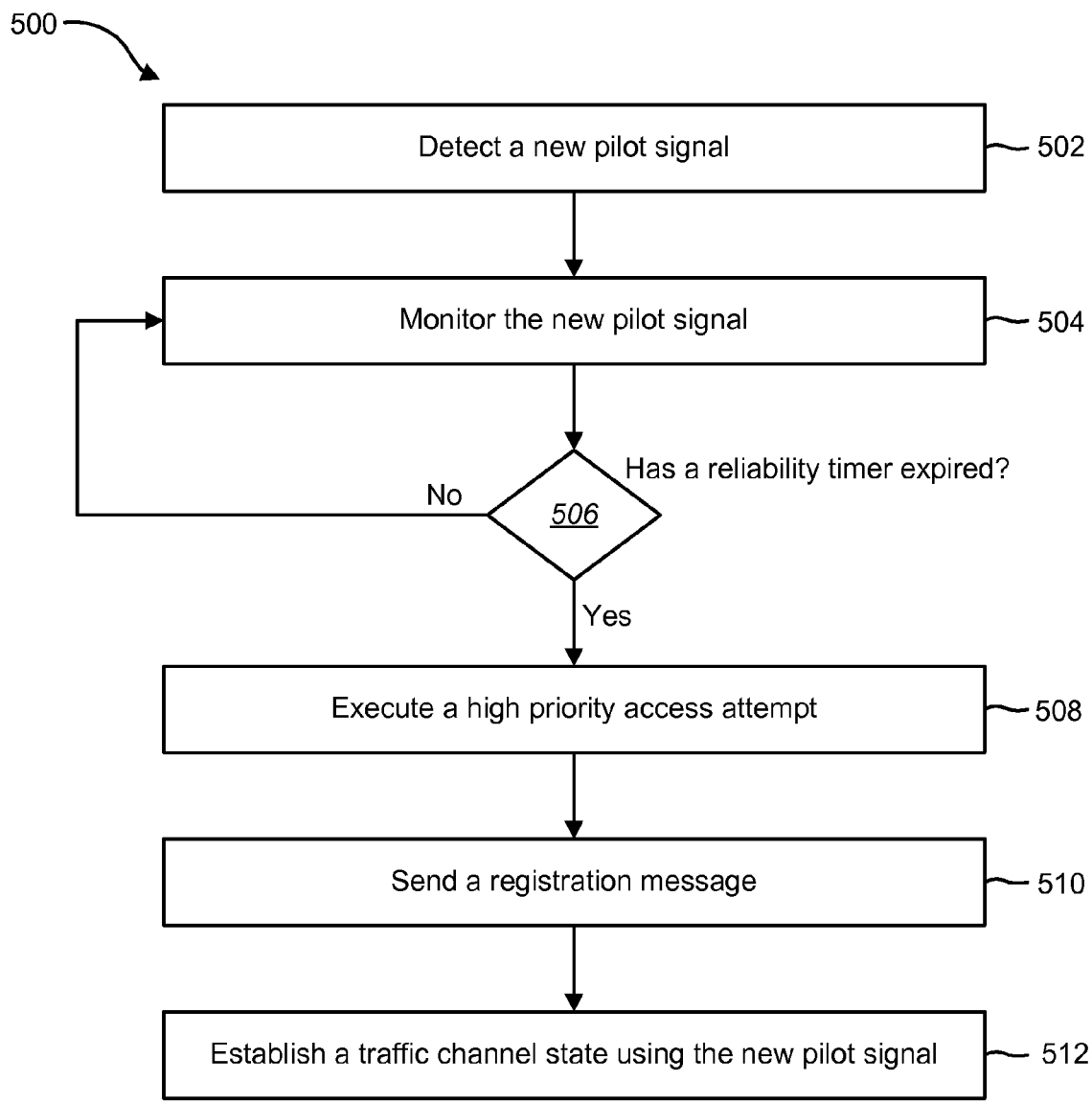
FIG. 5 is a flow diagram illustrating one configuration of a method for maintaining a call using a newly detected pilot signal.

FIG. 5 is a flow diagram illustrating one configuration of a method 500 for maintaining a call using a newly detected pilot signal. The method 500 may be implemented by the mobile station 108. In one example, a new pilot signal may be detected 502. The new signal may be monitored 504 to determine if it is reliable. A determination 506 may be made as to whether or not a reliability timer has expired. If the timer has not expired, the new pilot signal continues to be monitored 504. If the timer has expired, a high priority access attempt may be executed 508. In one configuration, a high priority signaling message exchange may be executed 508 between a mobile station and the base station 110. In one example, a high priority access attempt implies that signaling messages shall be processed at the base station 110 and the network infrastructure with higher priority and resources may be allocated as early as possible.

In addition, a registration message may be sent 510. The registration message may include a new registration type. The registration message may be an access probe. In one configuration, the power level at which the registration message (i.e., access probe) is sent 510 is at a level where the probability of the message being acknowledged by the base station is high. The registration message may also identify the mobile station 108 to a network or a base station 110 within the network. A traffic channel state may be established 512 using the new pilot signal. In one example, the mobile station 108 may continue with the call processing using the new pilot signal. The mobile station 108 may establish a soft handoff state with a previous pilot signal.

Figure 6:
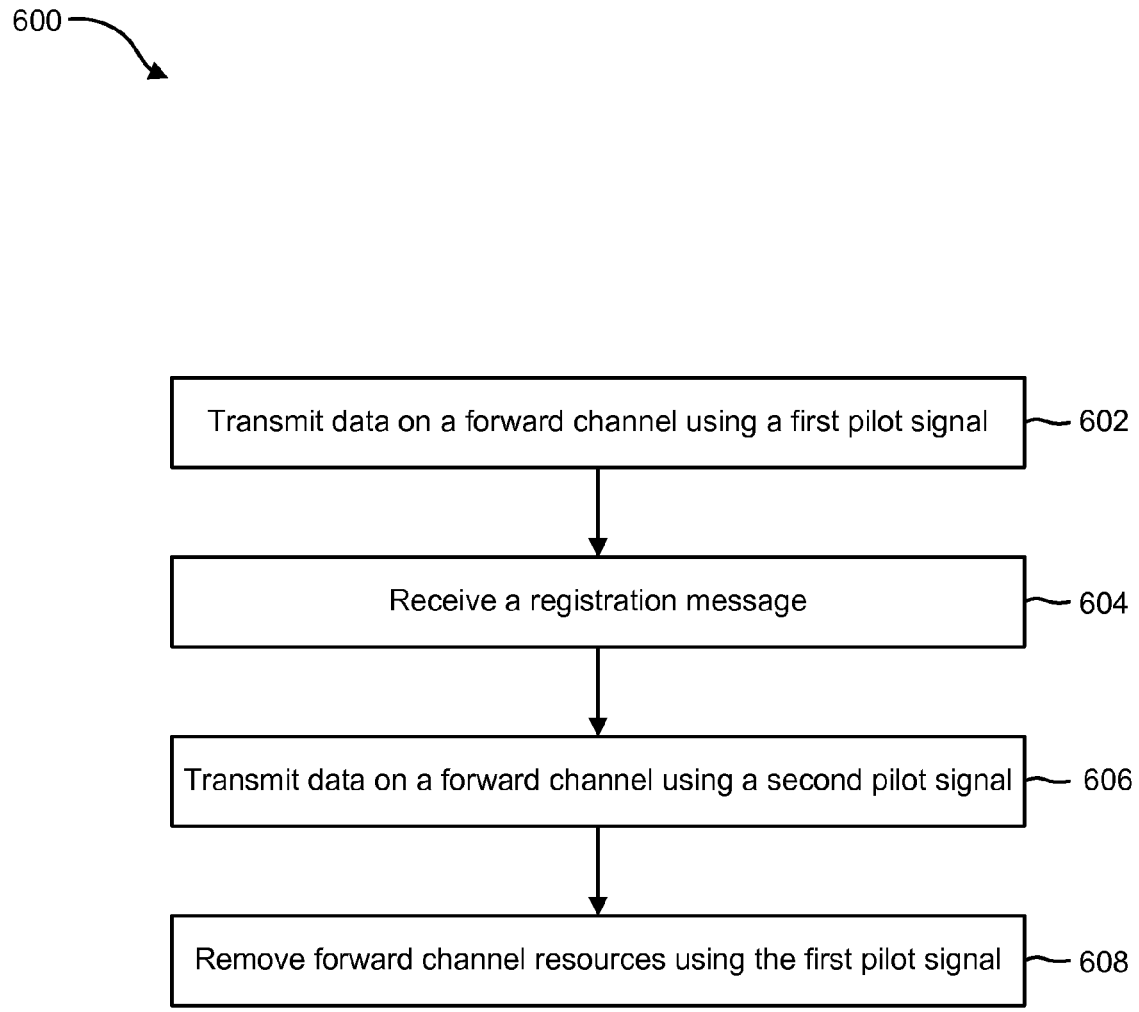
FIG. 6 is a flow diagram illustrating one example of a method for re-routing data on a forward channel using a new pilot signal.

FIG. 6 is a flow diagram illustrating one example of a method 600 for re-routing data on a forward channel using a new pilot signal. The method 600 may be implemented by a base station 110. Data may be transmitted 602 on a forward channel using a first pilot signal. A registration message may be received 604 from a mobile station 108. Data may then be transmitted 606 on the forward channel using a second pilot signal. In addition, forward channel resources that previously used the first pilot signal may be removed 608. In other words, existing traffic channel resources to a mobile station 108 on a previous pilot signal may be removed. In one configuration, the forward link capacity is improved because the previously allocated traffic channel resources are not utilized by the mobile station 108. The mobile station 108 may not utilize the previously allocated resources because the mobile station 108 is in an RF channel fade as previously explained.

The method 600 described above may be implemented by a single base station 110 or multiple base stations. For example, a single base station may have multiple pilot signals and/or multiple sectors. The single base station 110 may transmit a pilot signal for each of the multiple sectors. Alternatively, the method 600 may be implemented by at least two base stations 110. For example, a first base station 110 may transmit 602 data on a forward channel using a first pilot signal. A second base may transmit a second pilot signal that has improved signal strength over the first pilot station. As a result, the second base station 110 may receive 604 a registration message for a new registration. The second base station 110 may transmit 606 data on a forward channel using the second pilot signal. Either the first or second base station may remove 608 forward channel resources using the first pilot signal that were previously assigned to the mobile station 108.

Figure 7:
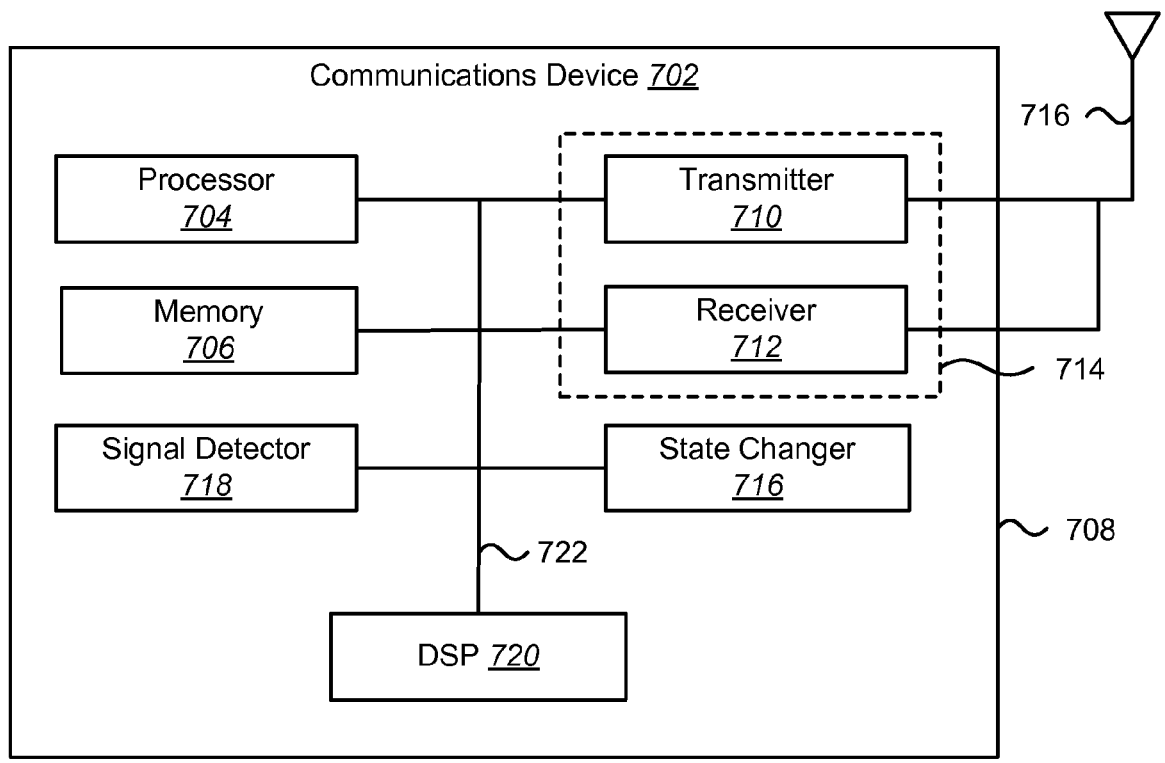
FIG. 7 illustrates various components that may be utilized in a wireless communication device.

FIG. 7 illustrates various components that may be utilized in a wireless communication device 702. The communication device 702 is an example of a device that may be configured to implement the various methods described herein. The communication device 702 may be the mobile station 108, a mobile telecommunications device, cellular telephone, handset, personal digital assistant (PDA), etc.

The communication device 702 may include a processor 704 which controls operation of the communication device 702. The processor 704 may also be referred to as a central processing unit (CPU). Memory 706, which may include both read-only memory (ROM) and random access memory (RAM), provides instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable to implement the methods described herein.

The communication device 702 may also include a housing 708 that may include a transmitter 710 and a receiver 712 to allow transmission and reception of data between the communication device 702 and a remote location. The transmitter 710 and receiver 712 may be combined into a transceiver 714. An antenna 716 may be attached to the housing 708 and electrically coupled to the transceiver 714. The communication device 702 may also include (not shown) multiple transmitters, multiple receivers, multiple transceivers and/or multiple antenna.

The communication device 702 may also include a signal detector 718 that may be used to detect and quantify the level of signals received by the transceiver 714. The signal detector 718 may detect such signals as total energy, pilot energy per pseudonoise (PN) chips, power spectral density, and other signals. The communication device 702 may also include a digital signal processor (DSP) 720 for use in processing signals.

The various components of the communication device 702 may be coupled together by a bus system 722 which may include a power bus, a control signal bus, and a status signal bus in addition to a data bus. However, for the sake of clarity, the various busses are illustrated in FIG. 7 as the bus system 722.

Figure 8:
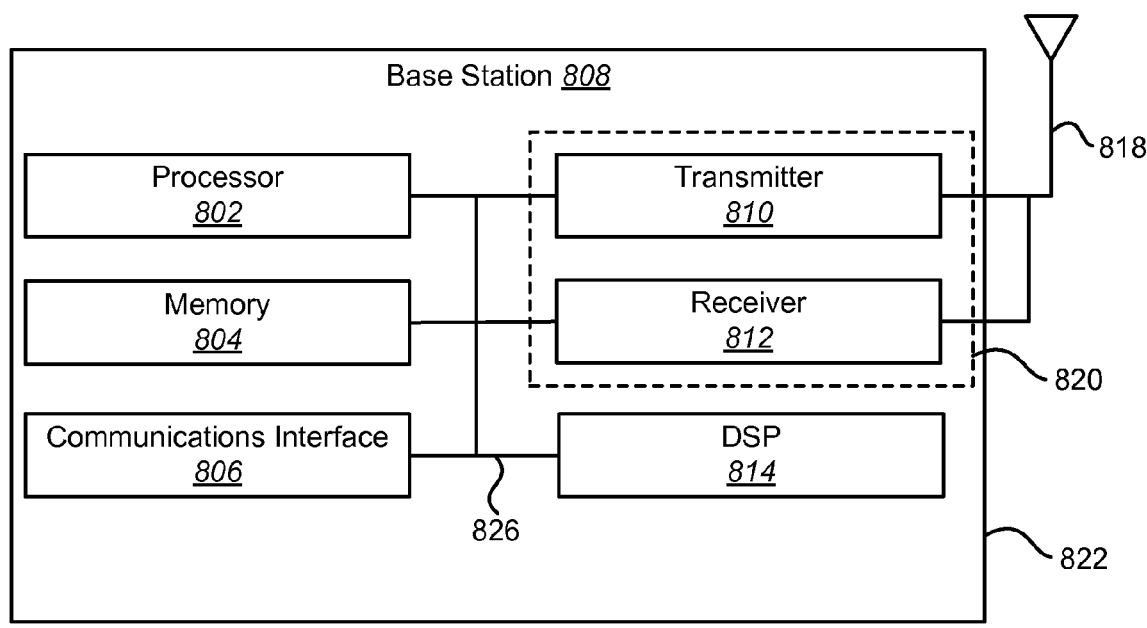
FIG. 8 is a block diagram of a base station in accordance with one example of the disclosed systems and methods.

FIG. 8 is a block diagram of a base station 808 in accordance with one example of the disclosed systems and methods. Examples of different implementations of a base station 808 include, but are not limited to, an evolved NodeB (eNB), a base station controller, a base station transceiver, an access router, etc. The base station 808 includes a transceiver 820 that includes a transmitter 810 and a receiver 812. The transceiver 820 may be coupled to an antenna 818. The base station 808 further includes a digital signal processor (DSP) 814, a general purpose processor 802, memory 804, and a communications interface 806. The various components of the base station 808 may be included within a housing 822.

The processor 802 may control operation of the base station 808. The processor 802 may also be referred to as a CPU. The memory 804, which may include both read-only memory (ROM) and random access memory (RAM), provides instructions and data to the processor 802. A portion of the memory 804 may also include non-volatile random access memory (NVRAM). The memory 804 may include any electronic component capable of storing electronic information, and may be embodied as ROM, RAM, magnetic disk storage media, optical storage media, flash memory, on-board memory included with the processor 802, EPROM memory, EEPROM memory, registers, a hard disk, a removable disk, a CD-ROM, etc. The memory 804 may store program instructions and other types of data. The program instructions may be executed by the processor 802 to implement some or all of the methods disclosed herein.

In accordance with the disclosed systems and methods, the antenna 818 may receive reverse link signals that have been transmitted from a nearby communications device 702. The antenna 818 provides these received signals to the transceiver 820 which filters and amplifies the signals. The signals are provided from the transceiver 820 to the DSP 814 and to the general purpose processor 802 for demodulation, decoding, further filtering, etc.

The various components of the base station 808 are coupled together by a bus system 826 which may include a power bus, a control signal bus, and a status signal bus in addition to a data bus. However, for the sake of clarity, the various busses are illustrated in FIG. 8 as the bus system 826.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer, a computing device, or an electronic device. By way of example, and not limitation, a computer-readable medium may comprise RAM, ROM, EEPROM, CD-ROM, networked streamed or other optical disk storage, magnetic disk storage or other magnetic storage devices, or any other medium that can be used to carry or store desired program code in the form of instructions or data structures and that can be accessed by a computer, a computing device, or an electronic device. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for maintaining a transmission during a channel fade, comprising:
   transmitting data on a first traffic channel associated with a first signal;
   detecting a second signal with a signal strength that is greater than the signal strength of the first signal;
   disabling a transmitter if a channel fade is detected for a predetermined first time period;
   monitoring the second signal for a predetermined second time period; and
   transmitting data on a second traffic channel associated with the second signal at the expiration of the second time period,
   the second signal being detected before the expiration of the first predetermined time period.

2. The method of claim 1, further comprising performing a high priority access attempt towards the second traffic channel associated with the second signal.

3. The method of claim 1, further comprising sending a registration message to a base station associated with the second signal.

4. The method of claim 1, wherein the first signal is a pilot signal.

5. The method of claim 1, wherein the second signal is a pilot signal.

6. The method of claim 1, further comprising disabling the transmitter if a predetermined number of frames with a signal quality below a predetermined threshold are received consecutively.

7. A method for maintaining a transmission during a channel fade, comprising:
   transmitting data on a first traffic channel associated with a first signal;
   detecting a second signal with a signal strength that is greater than the signal strength of the first signal;
   disabling a transmitter if a channel fade is detected for a predetermined first time period;
   monitoring the second signal for a predetermined second time period; and
   transmitting data on a second traffic channel associated with the second signal at the expiration of the second time period,
   monitoring the second signal to ensure reliability for the predetermined second time period by determining whether the second signal has at least a predetermined signal strength during the predetermined second time period.

8. A mobile device for maintaining a transmission during a channel fade, comprising:
   a processor;
   memory in electronic communication with the processor;
   instructions stored in the memory, the instructions being executable to:
   transmit data on a first traffic channel associated with a first signal;
   detect a second signal with a signal strength that is greater than the signal strength of the first signal;
   disable a transmitter if a channel fade is detected for a predetermined first time period;
   monitor the second signal for a predetermined second time period; and
   transmit data on a second traffic channel associated with the second signal at the expiration of the second time period,
   the second signal being detected before the expiration of the first predetermined time period.

9. The mobile device of claim 8, wherein the mobile device is a handset.

10. The mobile device of claim 8, wherein the instructions are further executable to perform a high priority access attempt towards the second traffic channel associated with the second signal.

11. The mobile device of claim 8, wherein the instructions are further executable to send a registration message to a base station associated with the second signal.

12. The mobile device of claim 8, wherein the instructions are further executable to disable the transmitter if a predetermined number of frames with a signal quality below a predetermined threshold are received consecutively.

13. A mobile device for maintaining a transmission during a channel fade, comprising:
   a processor;
   memory in electronic communication with the processor;
   instructions stored in the memory, the instructions being executable to:
   transmit data on a first traffic channel associated with a first signal;
   detect a second signal with a signal strength that is greater than the signal strength of the first signal;
   disable a transmitter if a channel fade is detected for a predetermined first time period; monitor the second signal for a predetermined second time period; and
   transmit data on a second traffic channel associated with the second signal at the expiration of the second time period,
   wherein the second signal is monitored to ensure reliability for the predetermined second time period by determining whether the second signal has at least a predetermined signal strength during the predetermined second time period.

14. A mobile device for maintaining a transmission during a channel fade, comprising:
   a processor;
   memory in electronic communication with the processor;
   instructions stored in the memory, the instructions being executable to:

transmit data on a first traffic channel associated with a first signal;

detect a second signal with a signal strength that is greater than the signal strength of the first signal;

disable a transmitter if a channel fade is detected for a predetermined first time period;

monitor the second signal for a predetermined second time period; and transmit data on a second traffic channel associated with the second signal at the expiration of the second time period, wherein the the second signal is detected before the transmitter is disabled.

15. An apparatus for maintaining a transmission during a channel fade, comprising:

means for transmitting data on a first traffic channel associated with a first signal;

means for detecting a second signal with a signal strength that is greater than the signal strength of the first signal;

means for disabling a transmitter if a channel fade is detected for a predetermined first time period;

means for monitoring the second signal for a predetermined second time period; and means for transmitting data on a second traffic channel associated with the second signal at the expiration of the second time period, wherein the means for detecting detects the second signal before the expiration of the first predetermined time period.

16. The apparatus of claim 15, further comprising means for performing a high priority access attempt towards the second traffic channel associated with the second signal.

17. The apparatus of claim 15, further comprising means for sending a registration message to a base station associated with the second signal.

18. The apparatus of claim 15, further comprising means for disabling the transmitter if a predetermined number of frames with a signal quality below a predetermined threshold are received consecutively.

19. An apparatus for maintaining a transmission during a channel fade, comprising:

means for transmitting data on a first traffic channel associated with a first signal;

means for detecting a second signal with a signal strength that is greater than the signal strength of the first signal;

means for disabling a transmitter if a channel fade is detected for a predetermined first time period;

means for monitoring the second signal to ensure reliability for a predetermined second time period by determining whether the second signal has at least a predetermined signal strength during the predetermined second time period; and means for transmitting data on a second traffic channel associated with the second signal at the expiration of the second time period.

20. A computer-program product for maintaining a transmission during a channel fade, the computer-program product comprising a computer readable medium having instructions thereon, the instructions comprising:

code for transmitting data on a first traffic channel associated with a first signal;

code for detecting a second signal with a signal strength that is greater than the signal strength of the first signal;

code for disabling a transmitter if a channel fade is detected for a predetermined first time period;

code for monitoring the second signal for a predetermined second time period;

code for transmitting data on a second traffic channel associated with the second signal at the expiration of the second time period; and code for detecting the second signal before the transmitter is disabled.

21. The computer-program product of claim 20, wherein the instructions further comprise code for performing a high priority access attempt towards the second traffic channel associated with the second signal.

22. The computer-program product of claim 20, wherein the instructions further comprise code for sending a registration message to a base station associated with the second signal.

23. The computer-program product of claim 20, wherein the instructions further comprise code for disabling the transmitter if a predetermined number of frames with a signal quality below a predetermined threshold are received consecutively.

24. A computer-program product for maintaining a transmission during a channel computer-program product comprising a computer readable medium having instructions thereon, the instructions comprising:

code for transmitting data on a first traffic channel associated with a first signal;

code for detecting a second signal with a signal strength that is greater than the signal strength of the first signal;

code for disabling a transmitter if a channel fade is detected for a predetermined first time period;

code for monitoring the second signal for a predetermined second time period to ensure reliability for the predetermined second time period by determining whether the second signal has at least a predetermined signal strength during the predetermined second time period; and code for transmitting data on a second traffic channel associated with the second signal at the expiration of the second time period.

25. A computer-program product for maintaining a transmission during a channel fade, the computer-program product comprising a computer readable medium having instructions thereon, the instructions comprising:

code for transmitting data on a first traffic channel associated with a first signal;

code for detecting a second signal with a signal strength that is greater than the signal strength of the first signal;

code for disabling a transmitter if a channel fade is detected for a predetermined first time period;

code for monitoring the second signal for a predetermined second time period;

code for transmitting data on a second traffic channel associated with the second signal at the expiration of the second time period; and code for detecting the second signal before the expiration of the first predetermined time period.

* * * * *